R. W. CRARY.
CAN.
APPLICATION FILED MAY 23, 1917.
1,308,892.
Patented July 8, 1919.
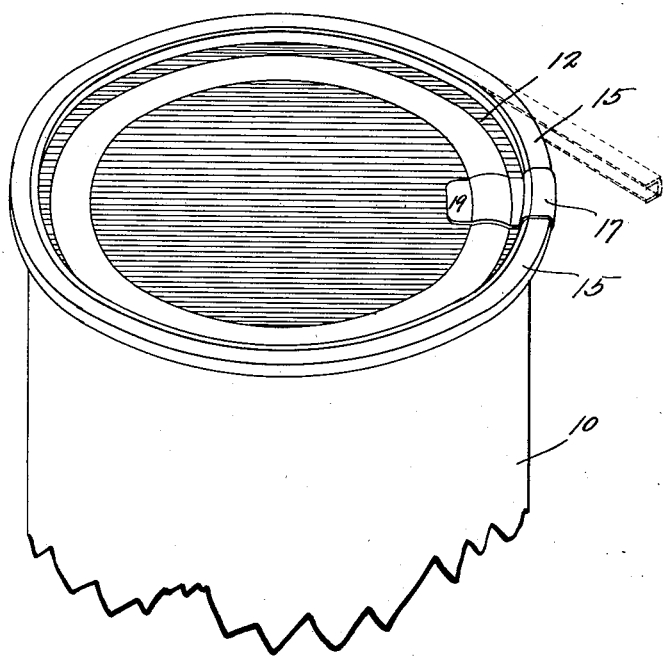
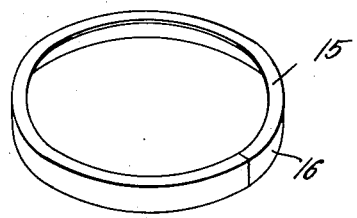
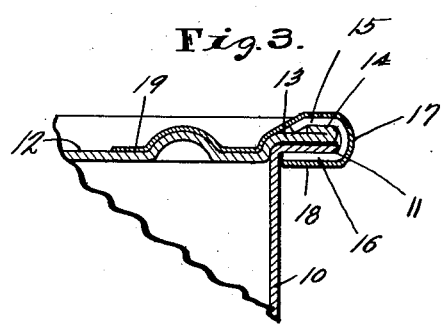
Witness
Frank A. Sable
Inventor
Ralph W. Crary,
By
Hood & Schley
Attorneys

UNITED STATES PATENT OFFICE.

RALPH W. CRARY, OF WAUKESHA, WISCONSIN.

CAN.

1,308,892.  Specification of Letters Patent.  Patented July 8, 1919.

Application filed May 23, 1917. Serial No. 170,343.

*To all whom it may concern:*

Be it known that I, RALPH W. CRARY, a citizen of the United States, residing at Waukesha, in the county of Waukesha and State of Wisconsin, have invented a new and useful Can, of which the following is a specification.

The object of my invention is to produce a simple and efficient sealing ring for that type of cans comprising mating circumferential flanges of can body and cover.

The accompanying drawings illustrate my invention. Figure 1 is a perspective fragmentary view, illustrating my invention; Fig. 2 a perspective view of the ring in one form in which it may be applied to the can; Fig. 3 a fragmentary section.

In the drawings, 10 indicates the main body of the can, provided with a circumferential flange 11 at its end. Mating with the open end of the body 10 is a cover 12, provided with a circumferential flange 13, the edge of which is turned backwardly, as indicated at 14.

Thus far the structure is common can and cover construction. My improved sealing strip comprises a ring having flanges 15 and 16 which may be either initially formed parallel with each other, as shown in Fig. 1, or may be formed at right angles to each other, as shown in Fig. 2.

The mating ends of the sealing ring preferably abut squarely when applied to the flanges 11 and 13, and flanges 15 and 16 are then rolled tightly upon flanges 11 and 13, the inner edge of flange 15 being bent downwardly beyond the inner edge of portion 14 of flange 13. After the sealing ring has been applied, and in order to insure a tight holding of the cover upon the can at the point where the ends of the sealing ring abut, I apply a fastening piece 17, one end 18 of which is turned beneath flange 16, and the other end of which is pressed down over flange 15 and carried inwardly over the cover 12, being conveniently pressed down upon the cover to form a finger piece 19 which may be readily engaged and lifted. This piece 17 need not be of material possessing great stiffness, but should be of such character that the part 19 may be rather readily lifted by the fingers and the piece 17 stripped from place. Thereupon, by inserting a knife, or other instrument, between the abutting ends of the sealing ring, said ring may be readily stripped from the can.

I claim as my invention:

The combination with a can and cover having mating circumferential flanges, of a U-shaped sealing strip applied to said flanges so as to embrace the same, and a fastening piece externally applied by pressure to the sealing strip so as to embrace the same at the junction of its ends, said fastening strip having a portion overlying the cover free from the sealing strip and capable of being readily lifted to permit withdrawal of the fastening member and consequent exposure of the adjacent ends of the sealing strip.

In witness whereof I, RALPH W. CRARY, have hereunto set my hand at Waukesha, Wisconsin, this seventeenth day of May, A. D. one thousand nine hundred and seventeen.

RALPH W. CRARY.